J. I. GUETL.
SHAFT BEARING.
APPLICATION FILED AUG. 3, 1914.

1,178,231.

Patented Apr. 4, 1916.

WITNESSES
Walter P. Geyer.
W. Ray Taylor

INVENTOR
John I. Guetl,
by Geyer & Popp
ATTORNEYS.

UNITED STATES PATENT OFFICE.

JOHN I. GUETL, OF BUFFALO, NEW YORK, ASSIGNOR OF ONE-SIXTH TO CARL F. GEYER AND ONE-SIXTH TO THEODORE L. POPP, BOTH OF BUFFALO, NEW YORK.

SHAFT-BEARING.

1,178,231.   Specification of Letters Patent.   Patented Apr. 4, 1916.

Application filed August 3, 1914. Serial No. 854,695.

*To all whom it may concern:*

Be it known that I, JOHN I. GUETL, a citizen of the United States, residing at Buffalo, in the county of Erie and State of New York, have invented new and useful Improvements in Shaft-Bearings, of which the following is a specification.

This invention relates to the class of self-oiling shaft bearings or journal boxes which are provided in their bottom with an oil well or reservoir into which dips a collar or flange secured to the shaft, so as to elevate the oil to the top of the latter, an oil-deflecting saddle being mounted on said collar and the shaft seat of the bearing being provided at its ends with channels or passages through which the surplus oil returns into the reservoir.

One of the objects of my invention is to improve the bearing with a view of preventing waste or escape of oil at its ends and averting the danger of fire by the dripping of oil on the floor and by heating of the bearing due to emptying it in a relatively short time on account of such waste.

A further object is to improve the construction of the saddle or oil deflector, with a view of increasing its durability, preventing leakage of oil between it and said collar, and effecting a quiet flow of the oil over the top of the shaft to prevent its splashing and leaking through the joint between the upper and lower sections of the bearing-box.

Figure 1:
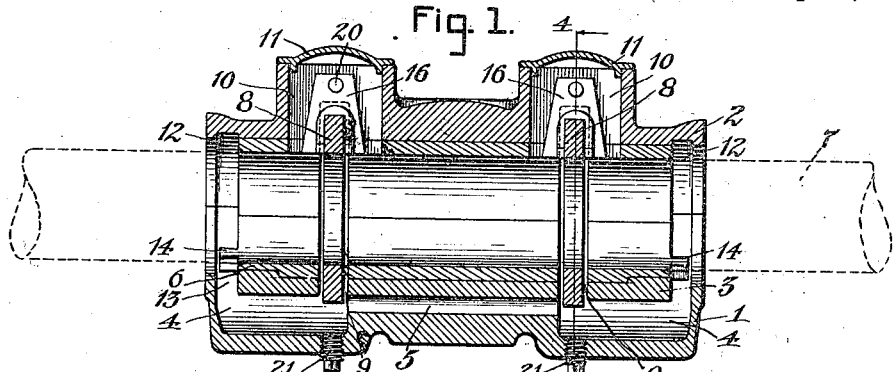
Figure 2:
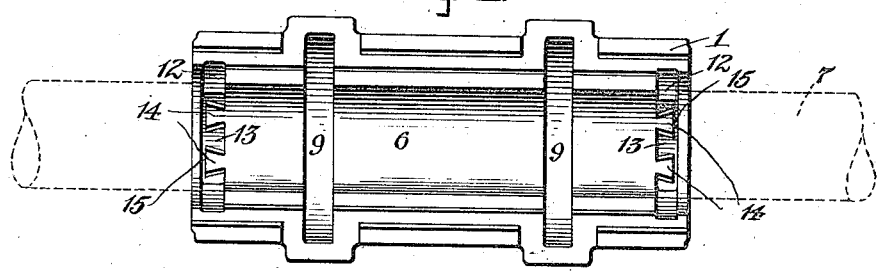
Figure 3:
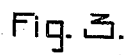
Figure 3:
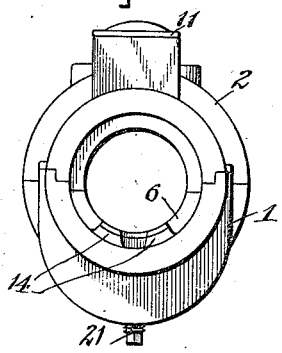
Figure 4:
Figure 4:
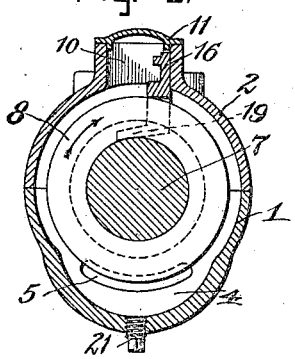
Figure 5:
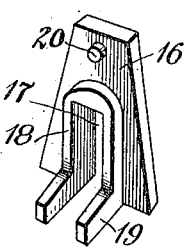

In the accompanying drawings: Figure 1 is a longitudinal central section of the bearing, with the shaft shown in dotted lines. Fig. 2 is a top plan view of the lower section of the bearing. Fig. 3 is an end view of the complete bearing. Fig. 4 is a transverse section thereof on line 4—4, Fig. 1. Fig. 5 is a perspective view of the saddle.

Similar characters of reference indicate corresponding parts throughout the several views.

1 indicates the lower section of the bearing box or body and 2 the cap or upper section which parts are clamped or otherwise secured together in any ordinary or suitable manner.

3 indicates the semi-cylindrical shaft-seat which is formed in the lower section of the bearing and under which the oil-reservoir is located. In the construction shown, this reservoir comprises a pair of wells 4 arranged near opposite ends of said lower section and connected by a channel 5 in its central portion.

The bore or shaft seat of the bearing may be provided with the usual lining or bushing of babbitt 6, or other suitable material.

7 indicates the shaft or journal to which are secured one or more oil-elevating collars or flanges 8 which extend through transverse slots 9 formed in the shaft seat 3 and its lining and dip into the oil in the reservoir 4, in a well known manner. The upper portions of these collars extend through similar slots in the top of the lining 6 and into filling and inspection-openings 10 having removable covers 11.

Adjacent to the ends of the shaft-seat the bearing-box has annular oil grooves or channels 12 which are provided in their bottom-portions with slots or passages 13 leading to the reservoir 4, for returning any surplus oil thereto. Projecting from each end of the shaft-seat 3 are two or more oil-scrapers or lugs 14 which overhang the slots 13 and are adapted to intercept and scrape from the underside of the shaft any oil which may creep outwardly beyond the ends of the shaft-seat 3, the oil thus removed from the shaft dripping over the lateral edges of the scrapers into the reservoir. For this purpose the upper faces of the scraper-lugs are flush with the face of the lining 6 and free from projections of any kind and are parallel with the axis of the bearing, us presenting smooth surfaces to the shaft which are not liable to cut or score it. In order to direct such detached oil inwardly along the edges of the scrapers and thus insure its deposit into the reservoir, the scrapers are preferably made of dove-tailed form or so that their lateral edges converge inwardly, as shown in Fig. 2. The outer ends of the scrapers terminate short of the outer walls of the return-slots 13 to leave intervening drip-spaces or passages 15 through which any oil reaching the outer ends of the scrapers may drip into the reservoir.

In the embodiment of the invention shown in the drawings, two scrapers are arranged at each end of the shaft-seat. They are located on opposite sides of the longitudinal center line of the seat and separated by an intervening space, as shown, so that neither of the surfaces bears against the lowermost portion of the shaft.

I am aware that it has been proposed to locate a single oil scraper centrally at each end of the shaft-bearing, but I have found by experiment that this arrangement is impracticable because some of the oil intercepted by the scraper creeps from the outer end thereof along the bottom or lowermost portion of the shaft and escapes from the bearing, dripping upon the floor and emptying the bearing in so comparatively short a time as to incur the danger of fire by heating of the bearing.

By employing a plurality of scrapers arranged on opposite sides of the center line of the shaft seat with a space between them along that line, any oil creeping outward along the bottom of the shaft opposite said central space is intercepted by one or the other of said scrapers, according to the direction of rotation of the shaft, thereby fully and effectually removing such oil from the shaft and returning it into the reservoir before it has time to creep beyond the ends of the bearing.

By preventing leakage and waste of oil, this bearing is very economical and will lubricate a shaft for a considerable period without requiring any care or attention. Hence, the liability of the bearing becoming hot and causing a fire is correspondingly minimized.

The scrapers 14 are preferably babbitted as well as the shaft seat 3, as shown in the drawings.

16 indicates the saddles or oil-deflectors arranged in the inspection-openings 10 and straddling the oil-elevating collars 8. Each of these saddles is provided in its lower edge with a notch 17 which receives the companion collar and snugly fits the same to prevent leakage of oil between these parts. It has been found in practice that owing to the grinding action of the collar the notches of saddles as ordinarily constructed are soon enlarged to such an extent as to allow the oil to leak or pass freely between the saddles and the collars, thus practically defeating the oil-distributing action of the saddles. To overcome this objection I bound the edge of the saddle-notch by a rib or flange 18 which projects beyond the face of the saddle and has its inner edge flush with the edge of the notch, thereby enlarging the bearing or contact area between the saddle and collar, materially increasing the durability of the saddle and preventing such objectionable leakage.

The saddle-flange 18 is preferably located on its front side, as shown. It has been found in practice that by this arrangement the oil, as it is elevated by the shaft-collar, is gently broken up and deflected laterally by the flange before striking the more extensive surface presented by the body of the saddle, preventing splashing of the oil and leakage thereof through the joint between the upper and lower sections of the bearing box, which occurs in the use of ordinary saddles against which the oil dashes with such violence as to leak through said joint.

During the rotation of the shaft, the saddle rests loosely against the rear wall of the inspection-opening 10, as shown in Fig. 4, and to prevent forward tilting of the saddle, it may be provided with feet 19 which rest on the shaft. In the construction shown, these feet form forwardly-projecting continuations of the flange 18. A handle or projection 20 is preferably provided at the top of the saddle for conveniently withdrawing it from the inspection-opening 10, when desired.

In its bottom the reservoir has the usual openings for draining off the oil when it becomes too thin or watery, these openings being closed by screw plugs 21.

I claim as my invention:

1. A shaft-bearing having a shaft-seat, a reservoir located beneath said seat and an oil return passage arranged at the end of said seat and leading to the reservoir, said seat being provided at its end with a projecting scraper located at a distance from the longitudinal center-line of the seat, thereby avoiding contact of the scraper with the lowermost portion of the shaft, the face of the scraper being free from projections and parallel with the axis of the bearing from end to end of the scraper, whereby the latter presents a smooth, non-cutting surface to the shaft.

2. An oil-distributing saddle for a bearing box, consisting of a plate having a notch in its lower portion, a projecting flange bounding said notch, and feet extending forwardly from the saddle and forming continuations of said flange.

Witness my hand this 31st day of July, 1914.

JOHN I. GUETL.

Witnesses:
C. F. GEYER,
E. M. GRAHAM.